Aug. 18, 1970 W. McKOWEN ET AL 3,524,243

METHOD FOR CURVING PRINTING PLATES

Filed Jan. 10, 1968

Inventors:
William McKowen
Sydney H. Dengle
By Bair, Freeman & Molinare Attys.

United States Patent Office 3,524,243
Patented Aug. 18, 1970

3,524,243
METHOD FOR CURVING PRINTING PLATES

William McKowen and Sydney H. Dengle, Des Moines, Iowa, assignors to Meredith Corporation, a corporation of Iowa Continuation-in-part of applications Ser. No. 422,506, Dec. 31, 1964, and Ser. No. 539,668, Apr. 4, 1966. This application Jan. 10, 1968, Ser. No. 696,841
Int. Cl. B23p *17/00;* B41n *11/00*
U.S. Cl. 29—423 8 Claims

ABSTRACT OF THE DISCLOSURE

This disclosure teaches how to curve an etched printing plate made from copper or the like without distorting the characters and half-tone dots comprising the printing surface thereof as this surface is stretched during curving. This is accomplished by temporarily laminating a sheet of spring steel bonded to a sheet of resilient thermoplastic resin to the etched plate. The plastic is applied under heat and pressure and fills in all of the depressions in the etched surface to protect the surface during bending. The assembly is curved as a unit on a three-roll bender to the radius of the cylinder of the press on which the plate will be used and after bending, the plastic-steel sheet is stripped from the plate. The thickness of the metal sheet employed is calculated to move the neutral plane of the printing plate upwardly from the center toward and past the etched printing surface so that the final strain distribution in the isolated curved printing plate has zero strain on the surface.

This application is a continuation-in-part of our copending applications, Ser. No. 539,668, filed Apr. 4, 1966, now abandoned and Ser. No. 422,506, filed Dec. 31, 1964, now abandoned, both entitled "Method of Making Printing Plates."

This invention relates to a method for curving printing plates to the curvature of a printing press cylinder without any detrimental distortion of the printing surface which normally occurs due to stretching of this surface. In preparing plates for multi-color letterpress printing, it is important that the half-tone image in the printing surface on each of the color plates remain as free from distortion as possible after curving so that the plates register and the original artwork is faithfull reproduced. The relationship between the half-tone dots ideally should be the same after curving as when the plate was flat. Although the present process is suitable for bending any soft metal printing plate, it is particularly adapted for printing flat etched, relatively thick plates which print directly on the paper. Such plates are not to be confused with electro-type shells, which are very thin and for this reason bend without undesirable distortion at the printing surface. The printing plates of the invention are preferably made from ¼ hard annealed copper, .040 inch to .070 inch in thickness, and are curved to the radius of the press cylinder after etching.

In curving plates of such thickness in a conventional three-roll bender, the printing surface is stretched and the back or face opposite the printing surface is compressed. The magnitude of the stretching depends upon the thickness of the plate and the radius of curvature. It will be appreciated that stretching of the etched printing surface will increase with an increase in thickness and with a decrease in the radius of curvature. It is desirable to hold the unit stretch in the radial direction to less than .005 inch per inch during bending. Stretching much beyond this causes moire distortion patterns in the image printed from the curved plates.

We have found that etched metal plates can be curved with minimum distortion by protecting the surface dots and other etched characters from being crushed by the bender with a protective soft resilient plastic material, and neutralizing the distorting forces in such a manner as to produce zero final strain at the printing surface after separation from the plastic. This is accomplished by pressing a sheet of heat softened thermoplastic resin into the depressions of the etched surface, said resin sheet being backed with a sheet of flexible metal during curving so that the neutral plane or surface is shifted from the midpoint between the front and back of the printing plate to a position above the surface of the plate. The method of the invention is described in detail in the following description and in the accompanying drawings in which:

Figure 3:
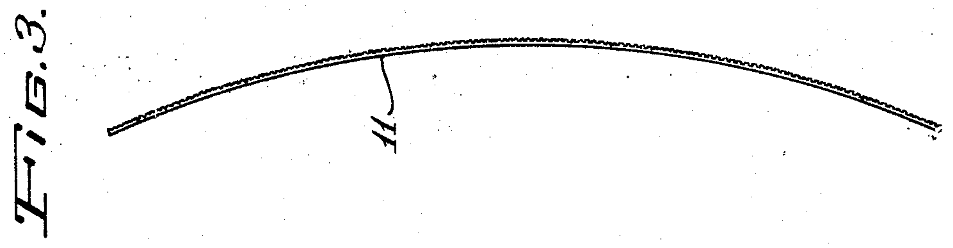
FIG. 3 is a sectional view of the curved plate of FIG. 2 with the steel and plastic layers removed.

In accordance with the present invention, the printing plate to be curved is one which has been etched in the flat. It is then curved in accordance with the procedure described below and locked to the printing press cylinder so that the impression printed on the paper is imparted by the etched printing surface, not by some duplicate plate made from the etched surface. The plate may be magnesium or zinc, but preferably is copper which has been powderless etched. The thickness of the plate is not critical, but it must have sufficient strength so that it does not bend easily when being prepared for locking on the press cylinder. If desired, the printing plate may be reinforced with aluminum metal or another rigid material to increase the thickness of the plate before locking to the press. The plate is etched to produce both the half-tones and the line work, the latter being deep etched to a depth as great as .030 inch. Therefore, the plate must be at least .035 or .040 inch thick and preferably from .040 inch to .070 inch.

When a plate of significant thickness is curved, the inner radial surface will be compressed and the outer radial surface will be elongated. In a curved printing plate, the printing surface lies on the larger radius and consequently it is this surface which is elongated or stretched. The magnitude of stretching is normally equal to the magnitude of the compressing on the back of the plate. A neutral plane, where the compressive and tensive forces are neutralized, i.e. equal to zero, lies approximately at the center of the plate, between the top and bottom surfaces. In accordance with the invention, the neutral plane in the plate is removed from the center to the printing surface. Ideally, the method is practiced in a way which neutralizes all forces at the printing surface, thereby eliminating the stretching and distortion which would otherwise occur. This is not possible as a practical matter, but sufficient neutralization is possible to minimize the strain and distortion so that excellent printing results can be achieved.

The first step in the process is to press into the printing face of the plate a sheet of thermoplastic material, thereby filling all of the depressions and providing lateral support for the side walls of the characters and dots etched therein. The sheet must be sufficiently thick to fill the depressions to their depth and still provide a cushioning blanket over the entire surface, projecting about .010 inch above the printing surface. A thermoplastic synthetic resin is preferred for this purpose since it can be softened by heat, will flow under slight pressure into the depression without distorting the characters or dots in the surface, and will resume normal hardness upon cooling. The resin should have sufficient elongation at room temperature to permit stripping from the deep-etched surface after the plate has been curved. We have found a non-plasticized co-polymer of vinyl chloride and vinyl acetate, like that commonly used in plating electrotype shells, to be satisfactory as the thermoplastic sheet material, although there are other resins available commercially which are operable, e.g. polyvinylidene chloride, polypropylene, polyvinyl chloride. The vinyl co-polymer should be heated to about 300° F. and pressed at about 100 lbs. per sq. in. to laminate it to the printing surface.

Figure 4:
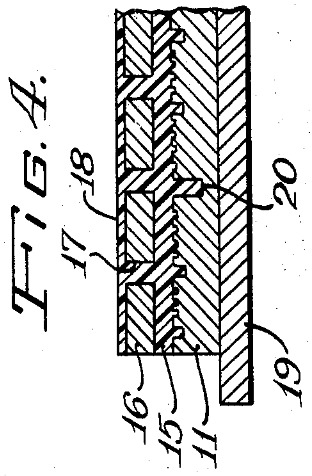
FIG. 4 is an enlarged sectional view of a modified assembly for curving a printing plate.

The second step is to assemble a flexible sheet of metal to the surface of the plastic in the laminate. Preferably, the metal sheet should be bonded or interlocked with the plastic to minimize differential movement between the metal and the plastic. It is important that the assembly function as a unit during the subsequent curving operation to shift effectively the neutral plane to a position above the printing face. For this reason it is also desirable that the thickness of the plastic (least rigid member of the assembly) between the metal and the printing surface be held to the minimum required to protect the etched face, because the thicker the plastic, the greater the relative movement within the laminated assembly. The sheet metal is preferably spring steel so that it will conform to a range of plate radii and may be used over and over again. This sheet may comprise part of the bending machine so that it is assembled with the plastic covered printing plate as the bending step is performed. However, the sheet may be bonded to the plastic prior to laminating the plastic to the printing plate. The bond may be provided by a suitable adhesive or it may be a mechanical lock effected by perforating the steel plate so that the plastic can flow through the perforations to form a thin sheet of plastic on the opposite side of the metal as shown in FIG. 4 of the drawings. After stripping, the plastic will deform again under heat and pressure so that it can be used in bending different printing plates. For this reason, spring steel is preferred as the metal backing, although it will be understood that any flexible metal sheet will serve the purpose.

It is important, however, that the metal sheet above the plastic covered printing face be of sufficient thickness to shift the neutral plane from the interior to the surface of the printing plate. This may be mathematically calculated for a printing plate of any given thickness with knowledge of the modulus of elasticity of the materials in the laminated assembly, the radius of curvature, and the yield stress of the printing plate metal. The equation for the calculation is as follows:

$$ts = \sqrt{\frac{2RGytc}{Es}}$$

in which:

$ts$=thickness of said sheet (inches)
R=radius of curvature of said press cylinder (inches)
$Gy$=yield stress of the copper (p.s.i.)
$tc$=thickness of the copper plate (inches)
$Es$=modulus of elasticity of metal comprising said flexible metal sheet (p.s.i.)

This equation assumes no slippage between the members of the laminate and that the force asserted by the plastic is a negligible quantity, which it is. The theory of the technique is premised on an initial strain distribution in the laminated assembly (steel, plastic, plate) that will result in the final strain distribution in the isolated printing plate being such that there is zero strain on the printing surface.

The above equation is valid when the thickness of the plastic sheet $tp$ used in the sandwich during bending is determined by the following equation:

$$tp = R\frac{Gy}{Ec}$$

in which $Ec$=modulus of elasticity of the printing plate and the other elements are defined above.

Figure 1:
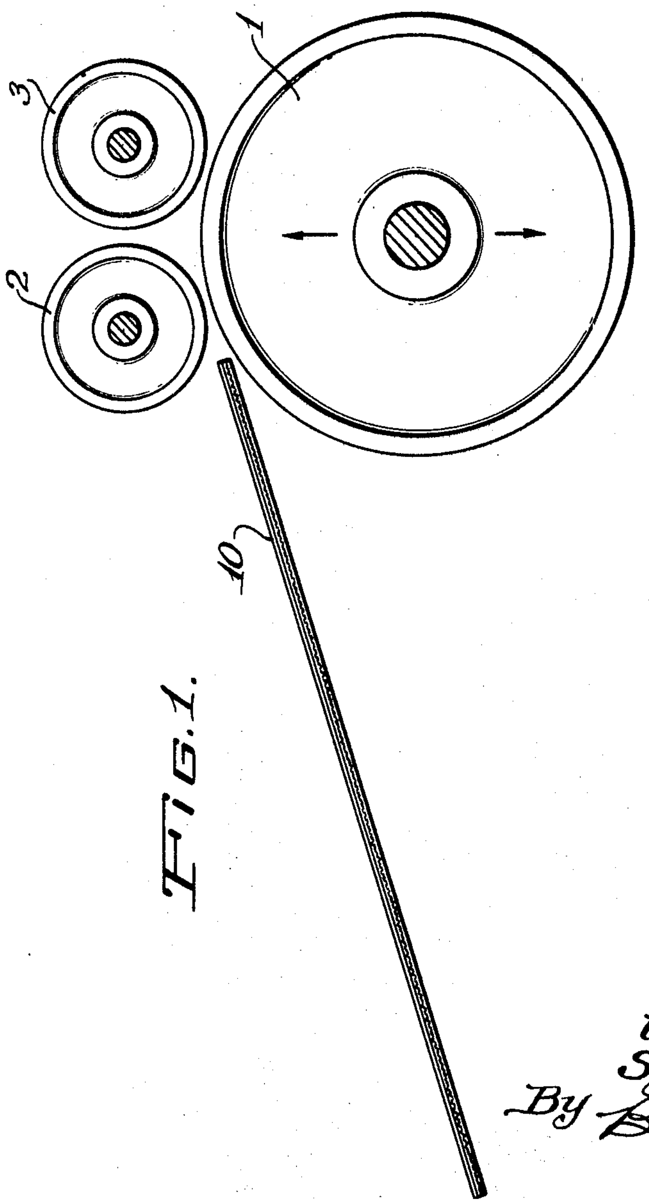
FIG. 1 is a diagrammatic sectional view through the conventional bending machine and a printing plate being curved thereon in accordance with the method of the invention.

Referring to FIG. 1, the three-roll bender has a drive roll 1 of large diameter, say, 6 inches, and two cooperating idler rolls 2, 3 about 2¼ inches in diameter. The drive roll is movable toward and away from the idler rolls which are fixed to the frame of the machine. A bender 30 inches wide is satisfactory for almost all printing plates and the movement of the drive roll will be within a range of .040 inch to .240 inch to control the curvature of the printing plate being processed. The idler rolls may be backed by a series of three support rolls (not shown) and a spring steel sheet (not shown) may be provided in contact with the rolls 2 and 3 at the nip to move with the work and distribute the force applied thereagainst. Such a machine is known in the art.

Unitary assembly 10 comprising a copper printing plate 11 having an etched printing surface 12, a layer of vinyl plastic 13 embedded in the surface 12, and a spring steel sheet 14, is prepared as indicated above. From the enlarged view in FIG. 2, it will be noticed that plastic 13 is interlocked with the surface 12 surrounding the etched characters therein and the sheet 14 is bonded to the other face of the plastic to provide an integral laminated assembly. The roll 1 is adjusted to the desired curvature and the laminated assembly is advanced between the rotating rolls by drive roll 1. After the assembly has been curved, the sheet 14 and plastic 13 is stripped away as a unit from the printing surface.

In FIG. 4, we have shown a modified assembly in which the sheet steel 16 has openings 17 through which the plastic 15 flows and interlocks with another thin sheet of plastic 18 on the opposite side of the metal 16. This assembly may be used again and again in curving printing plates. This is due to the fact that the metal 16 is springy and does not take a permanent set to any particular curvature. Furthermore, the thermoplastic resin 15, upon reheating, loses its shape and conforms to the configuration of the new surface against which it is pressed.

In FIG. 4, we have also shown a deep etched depression indicated at 20, which results in a relatively thin cross-section of material above the base of the printing plate 11. We have found that in some instances the metal from which the printing plate is made will crack at such points and to prevent this, we prefer to place another sheet of spring steel 19 in contact with the underside of the printing plate during the pressing operation. To minimize this cracking, and also to eliminate "hard edges" adjacent deep depressions in the surface of the printing plate, we prefer to use ¼ hard annealed copper. This material contains a small quantity of silver to insure better etching control using ferric chloride as the etchant. The hardness of this annealed copper ranges from 35–45 on the Rockwell B scale compared to values of 50–57 for copper which has not been treated. The tensile strength and the yield strength or elastic limit of the annealed copper is about 40,000 lbs. per sq. in. The annealed copper curves easier and more smoothly to radius and stresses less than standard copper plates.

Figure 2:
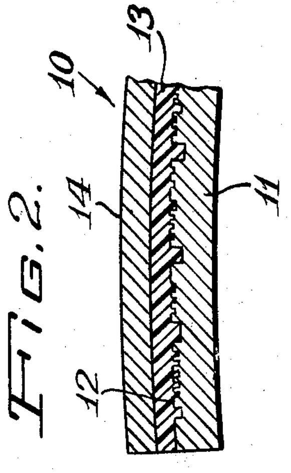
FIG. 2 is an enlarged sectional view through a portion of the curved plate immediately after removal from the bending machine.

Etched copper plates prepared from 16 gauge ¼ hard annealed copper were curved as part of the assembly shown in FIGS. 1 and 2. The sheet steel used in the assembly had a modulus of elasticity of $30 \times 10^6$ and a thickness of .040 inch. The thickness of the vinyl plastic was .024 inch. Optical measurements were made on points on the printing surface before and after curving and the surface strain in the tangential direction was less than .003 inch.

In order to provide a minimum thickness of plastic 13 between the printing plate 11 and the steel sheet 14, and at the same time completely fill the deep crevices in the surface of the plate, we have found that it is desirable to fill the deep crevices with a particulate material having the same composition as the plastic sheet. Plastic resins can be obtained in particulate form and placed in the bottom of these crevices. When this is done to take care of the deep depressions, it is possible to use a much thinner sheet of plastic since the only depressions remaining are the half-tones which are etched to a shallow depth. Thus, the relative movement due to the shifting within the plastic sheet is reduced to a minimum.

By following the teaching of our invention, the halftone rosette-pattern dots on the etched surface of a curved copper plate remain in essentially the same relative position as on the flat plate prior to curving. The rosette pattern, attributable to screen orientation (black 45°, magenta 75°, yellow 90°, and cyan 105°), is circular, 16 dots per 360° rosette. Observation under magnification reveals that this pattern is maintained after curving, thus providing excellent register, no ink trapping problems and good color balance.

The copper plate produced in accordance with our invention and chrome-plated for surface hardness is preferably laminated to a preformed aluminum or magnesium base plate by using a resinous adhesive and heat and pressure. The base plate, as well as the copper plate, varies in thickness no more than plus or minus .0005". As a result, the final laminated plate has no high or low spots which are prevalent in electrotypes to the extent of plus or minus .004". The laminate is scarfed and put on the press cylinder.

Alternatively, several of the curved copper plates may be laminated to a press cylinder wrap around and the wrap around, rather than each plate individually, is secured to the cylinder. The wrap around is a flexible steel sheet, .006 inch to .015 inch in thickness. The curved plates are adhered to the wrap around circumferentially to form a ribbon with a resinous adhesive (such as 3M P.A. 4459) which produces a tenacious bond when pressed at 25 to 250 p.s.i. at 400° F. The pressing operation may be performed on a machine having a rotating cylinder over the end of which the wrap around may be slipped. A curved heated platen moves down over the plate and wrap around to effect the lamination. The wrap around may be secured to the press cylinder mechanically or by vacuum or magnetically.

We claim:

1. A method of curving an etched metallic printing plate to the curvature of a printing press cylinder with minimum distortion of the etched printing surface comprising:

(a) pressing a heat-softened sheet of thermoplastic material against the etched surface to fill the depressions in said surface and to laminate the material to said surface to protect same, said plastic sheet being backed with a flexible metal sheet of sufficient thickness and modulus to shift the neutral plane from the interior to just above the surface of said printing plate during bending (b) mechanically bending said printing plate, plastic and metal backing sheet as a unit to the radius of said cylinder, and (c) removing said plastic and backing sheet from said printing plate.

2. The method of claim 1 in which said flexible metal sheet is bonded to said plastic sheet to prevent relative movement between the two.

3. The method of claim 1 in which said printing plate is copper and an additional supporting flexible metal sheet is placed in contact with the back of said printing plate to support the back side during curving.

4. The method of claim 1 in which said printing plate is made from ¼ hard annealed copper.

5. The method of claim 4 in which said flexible metal sheet has a thickness calculated in accordance with the following equation:

$$ts=\sqrt{\frac{2RGytc}{Es}}$$

in which $ts$=thickness of said sheet (inches)
R=radius of curvature of said press cylinder (inches)
Gy=yield stress of the copper (p.s.i.)
$tc$=thickness of the copper plate (inches)
E$s$=modulus of elasticity of metal comprising said flexible metal sheet (p.s.i.)

6. The method of claim 2 in which said plastic sheet is bonded to the flexible metal sheet by a mechanical interlock, the plastic sheet being of such thickness that it projects about .010 inch above the printing surface.

7. The method of claim 1 in which the deep depressions in the printing surface are filled with particulate plastic of the same material as said plastic sheet so that the particles will fuse to the sheet during said pressing step and be removed with said sheet after the plate has been curved.

8. The method of claim 1 in which several of said curved printing plates are adhesively bonded to a sheet steel wrap around to provide a circumferential ribbon for affixing to the printing press cylinder.

References Cited

UNITED STATES PATENTS

| | | | |
|---|---|---|---|
| 1,276,532 | 8/1918 | Hubbard. | |
| 1,620,042 | 3/1927 | Smith | 101—401.2 |
| 1,976,640 | 10/1934 | Upshaw | 101—375 |
| 2,108,822 | 2/1938 | Lippincott | 101—401.1 |
| 2,213,568 | 9/1940 | Rohland | 101—401.2 |
| 2,841,083 | 7/1958 | Kirkpatrick et al. | 101—401.1 |
| 2,977,876 | 5/1961 | Myers | 101—375 |

JOHN F. CAMPBELL, Primary Examiner

U.S. Cl. X.R.

29—424, 527.2; 72—46; 101—401.1